US007003889B1

(12) United States Patent
Luciani

(10) Patent No.: US 7,003,889 B1
(45) Date of Patent: Feb. 28, 2006

(54) TEMPLATE FOR FITTING EXIT HARDWARE ON A DOOR

(76) Inventor: Michael Luciani, 13321 Edinburgh Dr., Westminster, CA (US) 92683

( * ) Notice: Subject to any disclaimer, the term of this patent is extended or adjusted under 35 U.S.C. 154(b) by 0 days.

(21) Appl. No.: 10/890,644

(22) Filed: Jul. 14, 2004

Related U.S. Application Data

(60) Provisional application No. 60/487,165, filed on Jul. 14, 2003.

(51) Int. Cl.
*G01B 5/24* (2006.01)
*G01B 5/14* (2006.01)

(52) U.S. Cl. .............................. 33/194; 33/562; 33/613

(58) Field of Classification Search .................. 33/194, 33/197, 562, 563, 613, 645, 667
See application file for complete search history.

(56) References Cited

U.S. PATENT DOCUMENTS

| | | | | | |
|---|---|---|---|---|---|
| 537,870 | A | * | 4/1895 | Thielen et al. | 33/197 |
| 757,132 | A | * | 4/1904 | Lough | 33/197 |
| 1,577,943 | A | * | 3/1926 | Woodley | 33/197 |
| 1,599,025 | A | * | 9/1926 | Magnuson | 33/194 |
| 1,611,930 | A | * | 12/1926 | MacLeod | 33/197 |
| 1,680,575 | A | * | 8/1928 | Starbuck | 33/197 |
| 1,849,961 | A | * | 3/1932 | Snelling | 33/197 |
| 1,954,368 | A | * | 4/1934 | Sacrey | 33/197 |
| 2,634,507 | A | * | 4/1953 | Boatwright | 33/197 |
| 2,651,847 | A | * | 9/1953 | Sacrey | 33/197 |
| 2,659,159 | A | * | 11/1953 | Jarrett et al. | 33/197 |
| 2,733,518 | A | * | 2/1956 | Pszegon | 33/197 |
| 2,949,798 | A | * | 8/1960 | Berta, Jr. | 33/563 |
| 3,789,892 | A | * | 2/1974 | Converse et al. | 33/197 |
| 4,257,166 | A | * | 3/1981 | Barker et al. | 33/667 |
| 4,603,488 | A | * | 8/1986 | Nassoy et al. | 33/562 |
| 4,640,019 | A | * | 2/1987 | Paley | 33/563 |
| 4,715,125 | A | * | 12/1987 | Livick | 33/197 |
| 4,813,826 | A | * | 3/1989 | Riedel | 33/197 |
| 4,984,613 | A | * | 1/1991 | Szeto et al. | 33/562 |
| 5,114,285 | A | * | 5/1992 | Brydon | 33/197 |
| 5,335,421 | A | * | 8/1994 | Jones, Jr. | 33/494 |
| D356,271 | S | * | 3/1995 | Adamik et al. | D10/62 |
| 5,573,352 | A | * | 11/1996 | Matadobra | 144/144.51 |
| 5,762,115 | A | * | 6/1998 | Shouse | 33/197 |
| 6,343,632 | B1 | * | 2/2002 | Zivojinovic | 33/197 |
| 2002/0104228 | A1 | * | 8/2002 | Hill | 33/645 |

FOREIGN PATENT DOCUMENTS

| | | |
|---|---|---|
| WO | WO 92/15434 | 9/1992 |
| WO | WO 99/12710 | 3/1999 |

* cited by examiner

*Primary Examiner*—G. Bradley Bennett
(74) *Attorney, Agent, or Firm*—Eric Karich

(57) ABSTRACT

A template for cutting a door has a first sidewall having a plurality of through holes through the first sidewall indicating centers of proposed mounting holes, and a plurality of through slots, each having first and second edges separated by a width. Both the first and second edges indicate proposed cutting lines with the width operably spacing the first and second edges. First and second indicia printed on the first sidewall for indicating the through holes and the edges that together operate to indicate the holes and cuts necessary for first and second cutting operations, respectively.

16 Claims, 6 Drawing Sheets

TEMPLATE FOR FITTING EXIT HARDWARE ON A DOOR

CROSS-REFERENCE TO RELATED APPLICATIONS

This application for a utility patent claims the benefit of U.S. Provisional Application No. 60/487,165, filed Jul. 14, 2003. The previous application is hereby incorporated by reference in its entirety.

STATEMENT REGARDING FEDERALLY SPONSORED RESEARCH

Not Applicable

BACKGROUND OF THE INVENTION

The preparation of commercial wood doors for hardware is a specialized part of the door industry. The specialization comes from the great variety of hardware that can be used. For example, the preparation of a door for the attachment of exit devices may require a wide variety of preparations depending upon the specific type of exit device being installed. Previously, it has been necessary to use a specialized template that is unique to each exit device. The wide variety of possible preparations has prevented the development of a more advanced template, as the template could not be designed to handle more than one type of preparation.

The following represents the state of the art in this field:

Brydon, U.S. Pat. No. 5,114,285, (and the associated PCT application, WO 92/15434, teach a three-sided drilling template for preparing a door. The first and second sides of the template are parallel and contact opposite sides of the door. The third side of the template, orthogonal to and bridging the span between the first and second sides of the template, abuts the edge of the door. A plurality of through guide holes are located in each side of the template and indicate the centers of mounting holes for the mounting of operating hardware such as door locks and knobs. Indicatings on the template indicate the specific purpose of each through guide hole, and indicateed circles concentric with the through guide holes indicate the correct size of the mounting holes. A rectangular extension on the interior surface of the third side fits into a lock face recess previously formed or premachined in the edge of the door for accurate alignment of the template to the door.

Matadobra, U.S. Pat. No. 5,573,352, describes a similar template for routing hardware mounting apertures in doors. This template includes a spacer plate that can be mounted upon the template to provide proper back-set. The template includes a router guide-hole that is at least one inch.

Adamik et al., U.S. Des. 356,271, shows a combination template and boring jig that includes a lateral adjustment capability for positioning a router guide-hole similar to that of Matadobras.

C. Sturtz, U.S. Pat. No. 936,579, describes a mortise indicating device that is adapted to enable a carpenter to indicate and mortise a number of doors quickly and easily. The device includes an elongate stock that is positioned against the side of the door. A indicating point projects outwardly from the central portion of the face of the stock. Indicating plates are positioned on either side of the indicating point to provide indicating points that function to indicate the points on the door that are to be cut. A side plate, also having indicating points, is adapted to be positioned against the side of the door to indicate where holes are to be cut in the door. The position of the side plate can be readily adjusted with respect to the edge of the door.

Zivojinovic, U.S. Pat. No. 6,343,632 B1, describes a jig for removable fitment along the edge of a door which provides a suitable combination of guides and stops to allow the location and operation of suitable cutting tools such as drills or routers. The jig comprises a pair of parallel guide plates the distance between which is adjustable for removable fitment to opposing surfaces of the door. The guide plates are indicated with a center line (33) for correctly locating the jig at the proper height. Guide holes are located in the guide plates through which a drill or other suitable tool may be inserted. The jig has a guide associated therewith for allowing location of a suitable tool at the edge of the door for making a cylindrical hole or for machining a mortise therein for receiving the body of a mortise lock or a rebate for receiving the face plate of the lock mechanism. A guide block to facilitate accurate drilling is also disclosed.

Nashlund, U.S. Pat. No. 4,306,823, describes a jig for guiding the bits of boring and routing tools to predetermined locations on a door in preparation for the installation of a door knob assembly, dead bolt or the like. The apparatus includes an elongated channel-shaped frame member for receiving an edge of a door and having a base portion and two depending side portions, a pair of templates attached to respective side portions of the channel shaped frame member for guiding a boring tool bit to locations along the side of the door, a movable edge boring guide attached over the base portion of the frame for directing a boring tool to predetermined locations along the edge of the door, and a pair of clamps for clamping the frame firmly to the door. The base portion of the frame forms a router support surface to facilitate routing of the edge of the door.

A. E. Hand et al., U.S. Pat. No. 3,500,884, describes a latch installation tool jig. The jig includes a pair of face plates that are adapted to be clamped to a door using a pair of clamping mechanisms. A plurality of cutter assemblies are adapted to be mounted upon the frame to guide the various cutting steps required for preparing the door.

Diaz, U.S. Pat. No. 6,193,449 B1, describes a 3-sided bracket shaped template for drilling door knob and lock holes in doors. This template includes a lock plate at a right angle to a reverse plate. The template plate and reverse plate each contain rectangular apertures for drill passage, and the template plate further has bracket sleeves on the bottom and both sides of the rectangular aperture for slidably mounting removable plate guides each with different perpendicular cylindrical extension guide for drills of varying sizes. The lock plate also has a centered circular hole with a tubular drill guide perpendicular to the lock plate.

Riedel, U.S. Pat. No. 4,813,826, describes a jig for use with routers and other augering equipment for cutting the proper openings in a door for the installation of mortise locks. The jig formed in a U-shaped configuration is placed over the edge of the door at a proper height from the door sill and through a pivotal end plate adjustably positions itself on the door regardless of the contour of the encased edge of the door.

F. Catalanotto, U.S. Pat. No. 1,326,583, describes a hinge setter that includes side plates that can be adjusted laterally through the use of screws set into slots.

Kelly et al., U.S. Pat. No. 4,703,962, describes a magnetic door lock. This reference discusses the benefits of using a template to facilitate installation of the lock on the door.

Goldstein et al., U.S. Pat. No. 5,222,845, describes a drill guide apparatus for enabling the drilling of holes in a door for the installation of a door handle assembly. This apparatus has a U-shaped member sized to fit around the edge of a conventional door into which holes are to be drilled for the installation of the door handle assembly. A C-type clamp is included for rigidly clamping the U-shaped member to the edge of said door in the region to be drilled. A drill bushing is installed through a region of the U-shaped member in a location enabling, when the apparatus is clamped to the edge of the door, the guiding a drill for drilling a hole into the edge of the door. A plurality of side plates are provided, each having drill guide apertures arranged for guiding the drilling of holes for the installation of a particular type of door handle assembly. The side plates are detachably fastened to one leg of the U-shaped member so that when apparatus is clamped onto the edge of the door, the drill guide apertures are properly located.

Livick, U.S. Pat. No. 4,715,125, describes a drilling template for accurately positioning latch holes and lock cutouts in door stiles. The template includes a pair of spaced, parallel, rectangular, frame member that are rigidly interconnected at one end. The frame members straddle a vertical door stile with the interconnecting end firmly against the edge of the stile. Clamps on one frame member are then tightened. A latch hole drilling guide is centered in a plate at the interconnecting end of the frame, and various diameter hole saw guides on removable side plates are positionable at any of a plurality of selected positions along the length of the frame to provide cutout positions for any of many lock backsets.

Other examples include E. R. Rushton, U.S. Pat. No. 2,843,167 (jig for door locks), Adamik et al., U.S. Des. 356,271, and Zivojinovic, WO 99/12710.

The above-described references are hereby incorporated by reference in full.

The present invention is a template that can accommodate a wide variety of preparations. The template provides various advantages over the prior art, as discussed below.

SUMMARY OF THE INVENTION

The present invention teaches certain benefits in construction and use which give rise to the objectives described below.

The present invention provide a template for cutting a door. The template includes a first sidewall, and may further include second and third sidewalls. A plurality of through holes through the first sidewall indicating centers of proposed mounting holes. A plurality of through slots through the first sidewall, each having first and second edges separated by a width. Both the first and second edges indicate proposed cutting lines with the width operably spacing the first and second edges. A first indicia printed on the first sidewall for indicating the through holes and the edges that together operate to indicate the holes and cuts necessary for a first cutting operation. A second indicia printed on the first sidewall for indicating the through holes and the edges that together operate to indicate the holes and cuts necessary for a second cutting operation.

A primary objective of the present invention is to provide a template having advantages not taught by the prior art.

Another objective is to provide a template for cutting a door that can accommodate many types of door hardware all within a single template.

A further objective is to provide a template for cutting a door that is easy to use and can be used to quickly and accurately install door hardware.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
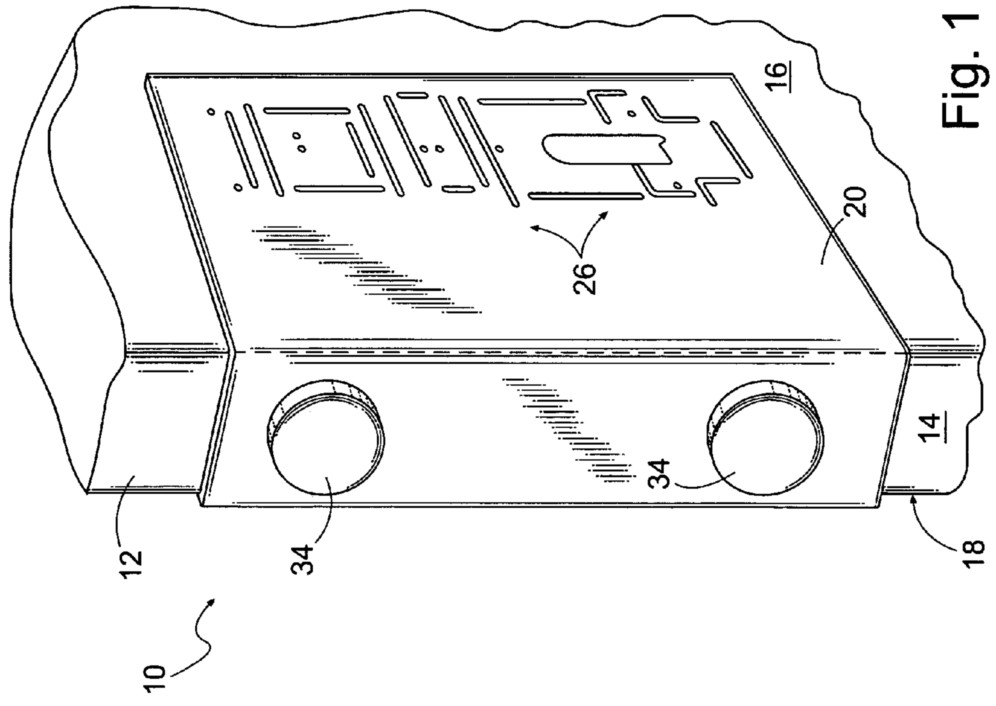
FIG. 1 is a perspective view of the preferred embodiment of the present invention, a template for fitting exit hardware on a door, the template being illustrated once it has been mounted upon the door.

FIG. 1 illustrates a template 10 for preparing a door 12 for the mounting of various types of exit hardware (not shown). The template 10 includes a plurality of apertures and slots 26 for indicating where the cuts should be made and holes drilled, once the template 10 has been mounted upon the door 12, as shown and as described below. The door 12 has an edge 14, a front face 16, and a rear face 18. The door 12 is prepared by various cutting and drilling actions to accept the various types of exit hardware.

Figure 2:
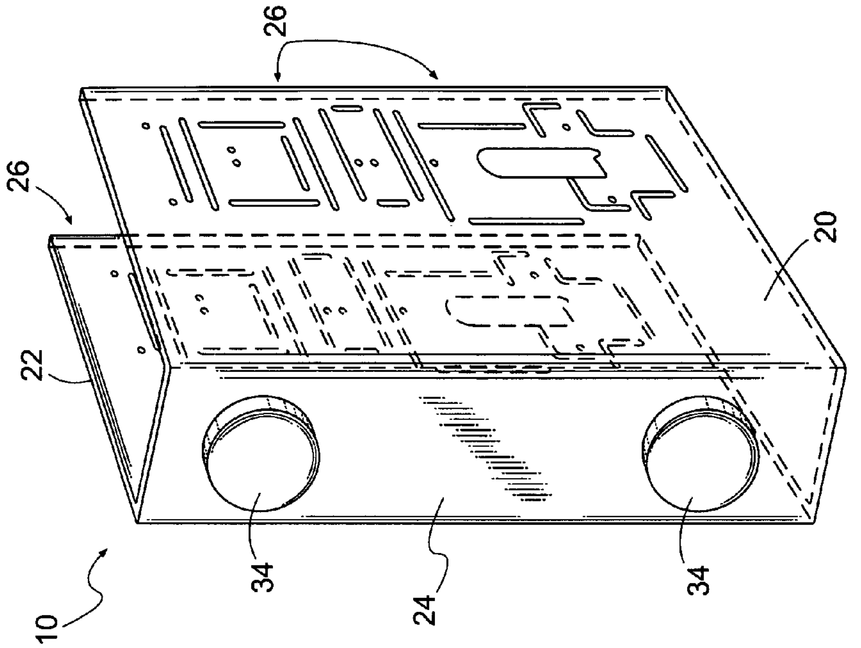
FIG. 2 is a perspective view of the template, illustrating first, second, and third sidewalls of the template.

FIG. 2 is a perspective view of the template 10, illustrating first, second, and third sidewalls 20, 22 and 24 of the template 10. The first sidewall 20 and the second sidewall 22 are supported in generally parallel planes by the third sidewall 24. For purposes of this disclosure, the term "generally parallel planes" shall mean only that the first sidewall 20 and the second sidewall 22 are supported to operatively abut or engage the front face 16 and the rear face 18, respectively, as described below, and the term should not be construed to require any precise geometric configuration. The template 10 is shaped such that when it is placed over the edge 14 of the door 12 such that the third sidewall 24 abuts the edge 14 of the door 12 and the first sidewall 20 abuts the front face 16 of the door 12, the template 10 is positioned for use. When we say that the third sidewall 24 abuts the edge 14 of the door 12, this does not require that the third sidewall 24 itself physically abuts the door 12, but could also include the contact between a pair of backset screws 34, described below, mounted through the third sidewall 24.

When we say that the first sidewall 20 and the second sidewall 22 are generally parallel, this only indicates the general positioning of the sidewalls, and does not require a strict geometric symmetry. Indeed, the sidewalls 20 and 22 may actually lie in slightly convergent planes, so that the template 10 functions to clamp the door 12 between the first and second sidewalls 20 and 22, such that the general resilience of the template 10 functions to hold the template 10 in place on the door 12.

The first sidewall 20, the second sidewall 22, and the third sidewall 24 may easily be formed in one operation and/or as one integrated part, making the device relatively simple to manufacture. For durability the template 10 may be manufactured from any of several plastics, and is preferably transparent to facilitate visually locating the template 10 on the door 12.

Figure 3:
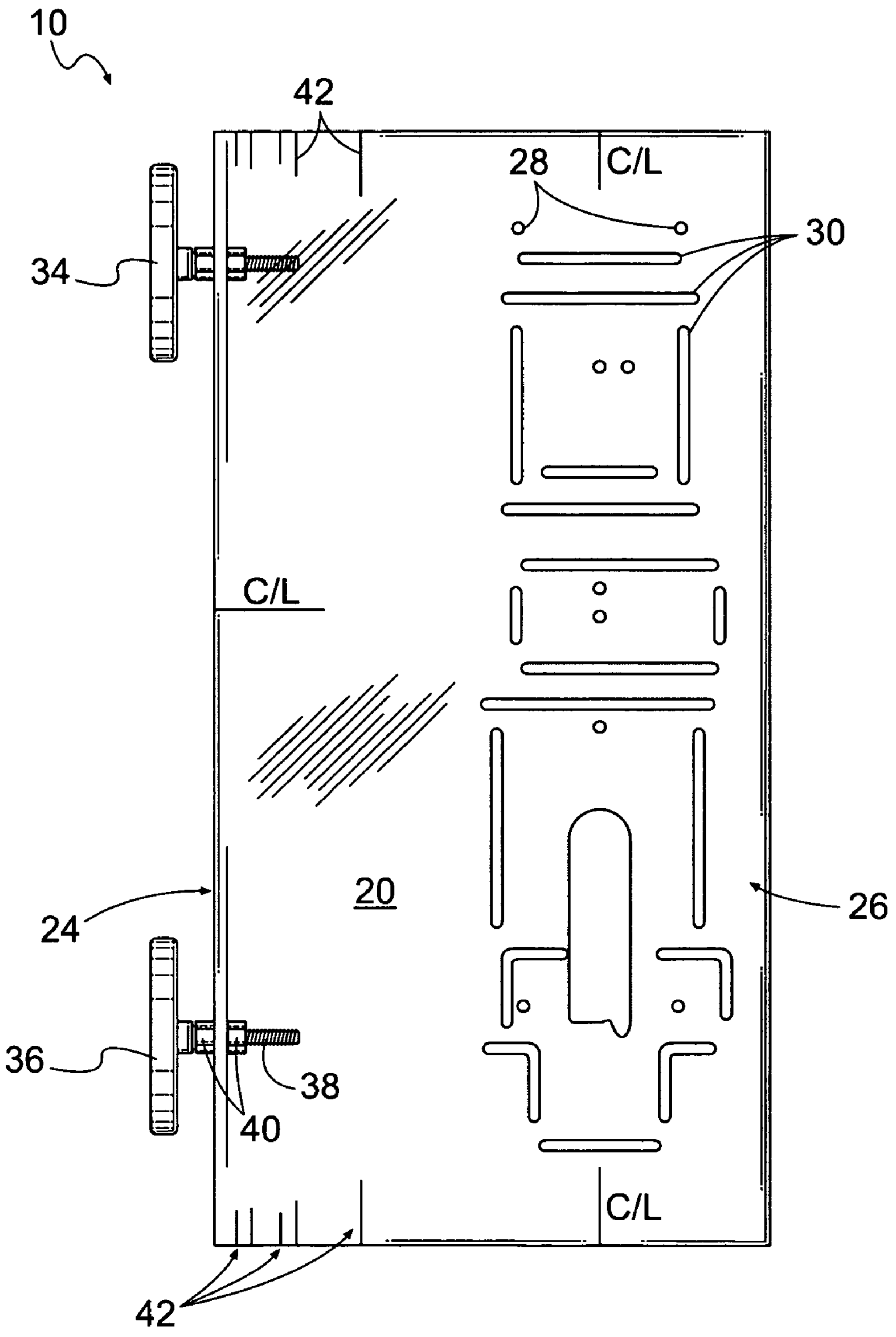
FIG. 3 is a front elevational view of the template illustrating a plurality of apertures and slots that are adapted to direct cutting actions to prepare the door for various types of exit hardware.

FIG. 3 is a front elevational view of the template 10 that illustrates the plurality of apertures and slots 26 used to guide the cutting of the door 12. The plurality of apertures and slots 26 may include a plurality of through holes 28 and a plurality of through slots 30, among other shapes. The plurality of through holes 28 are cut through the first sidewall 20 and possibly the second sidewall 22. The plurality of through holes 28 are used to indicate centers of proposed mounting holes for the exit hardware. The plurality of through slots 30 are cut through the first sidewall 20 and possibly the second sidewall 22. Each of the plurality of through slots 30 have edges 32 separated by a width W, at least one of the edges 32 indicating a proposed cutting line for the exit hardware.

The third sidewall 24 includes a means for adjusting the position of the third sidewall 24 with respect to the edge 14 of the door 12. In the present embodiment, the means for adjusting the position is a pair of backset screws 34 that extend through the third sidewall 24. The backset screws preferably each include a head 36 (comprising an easily graspable knob or similar structure), a threaded body 38, and a pair of locking nuts 40. The backset screws 34 function to adjust the distance between the third sidewall 24 and the edge 14 of the door 12. The first sidewall 20 preferably includes a plurality of backset markers 42 that show how much backset is being provided between the cuts that will be made and the edge 14 of the door 12. By twisting the backset screws 34, the user is able to adjust the backset until the edge 14 of the door 12 is located adjacent to one of the plurality of backset markers 42 that is desired. The pair of locking nuts 40 of each of the backset screws 34 is then adjusted to lock the backset screws 34 in the proper position.

While the preferred means for adjusting is disclosed in detail, the scope of the claimed invention should not be limited to this embodiment, but should include other arrangements of screws, spacers, adjusters, buttons, levers, or other mechanisms used to adjust the relative position of the third sidewall 24 with respect to the door 12.

Figure 4:
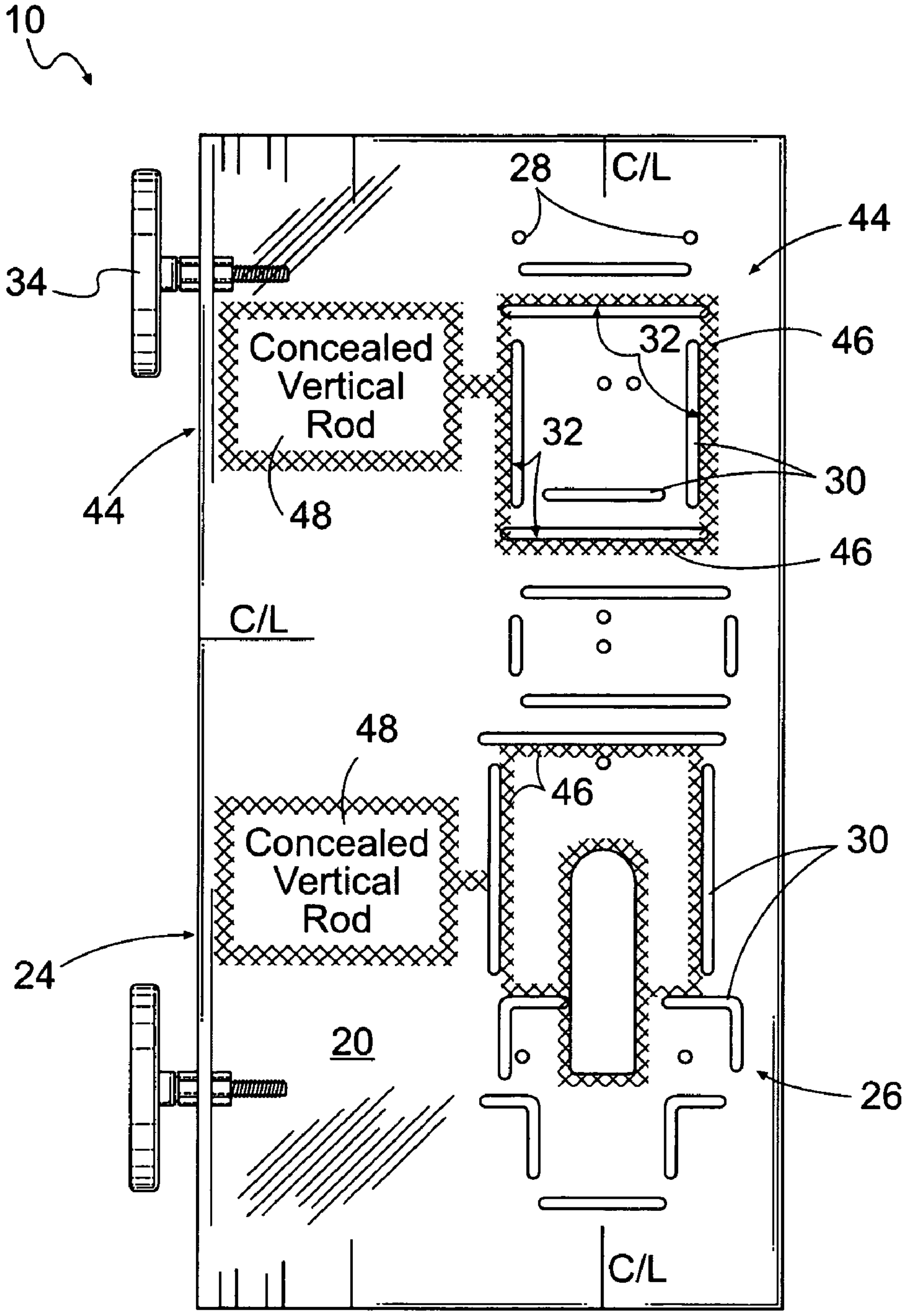
FIG. 4 is a front elevational view thereof illustrating first indicia that are directed towards guiding the installation of a first type of exit hardware.

FIG. 4 illustrates a first indicia 44 printed on the first sidewall 20 (and possibly the second sidewall 22) for indicating the through holes 28 and the edges 32 that together operate to indicate the holes and cuts necessary to install the first type of exit hardware. The first indicia 44 preferably includes an edge highlighting line 46 that abuts the edge 32 of the slots 30 that indicate where a cut should be made. The edge highlighting line 46 is preferably colored a first distinct color. The first indicia 44 preferably also includes a descriptive term 48 that is also the first distinct color. The descriptive term 48 is preferably printed on the first sidewall 20, functions to describe the nature of the cutting operation, and is associated with the first indicia 44. The user simply locates the edges 32 that are highlighted with the edge highlighting line 46, indicates those edges 32, then performs the cutting actions shown by the resulting indicates. The edge highlighting lines 46 are directed towards guiding the installation of the first type of exit hardware.

Figure 5:
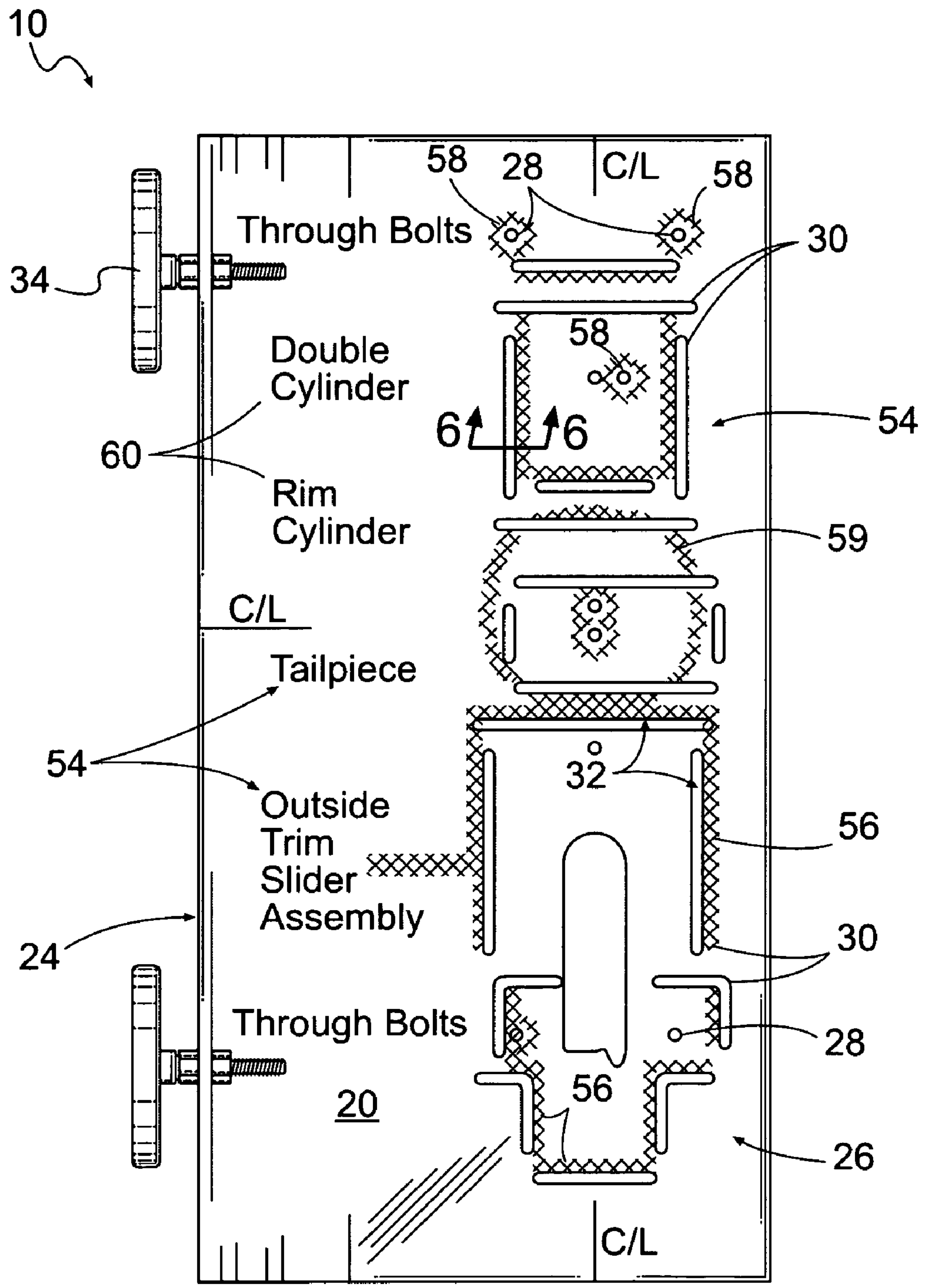
FIG. 5 is a front elevational view thereof illustrating second indicia that are directed towards guiding the installation of a second type of exit hardware.

FIG. 5 illustrates a second indicia 54 printed on the first sidewall 20 (and possibly the second sidewall 22) for indicating the through holes 28 and the edges 32 that together operate to indicate the holes and cuts necessary to install the second type of exit hardware. The second indicia 54 is generally the same as the first indicia 44, including second edge highlighting lines 56 and second descriptive terms 60 which are equivalent to the edge highlighting lines 46 and the descriptive terms 48, respectively. This same process is used with respect to the though holes 28 noted with an aperture highlighting circle 58. The size of the final hole can also be shown around the aperture with an aperture size indicating circle 59. The second edge highlighting lines 56 and the aperture highlighting circles 58 are directed towards guiding the installation of the second type of exit hardware. Obviously, those skilled in the art may devise a variety of shapes and configurations for guiding the installation of the various exit hardwares and related products that are currently produced or that will be produced in the future.

Figure 6:
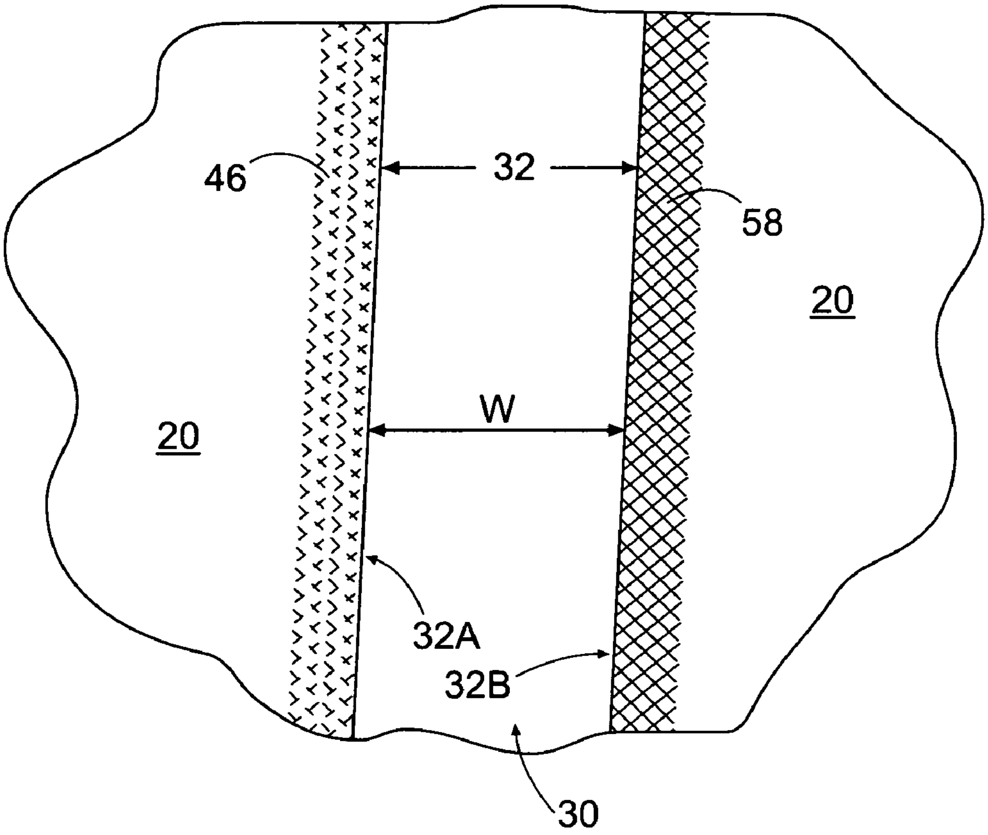
FIG. 6 is a view along lines 6—6 in FIG. 5, illustrating a slot having edges separated by a width.

FIG. 6 illustrates a slot 30 in the template 10. The slot 30 has a width W for separating the edges 32, in this case first and second edges 32A and 32B. In this case, the first edge 32A includes the first indicia 44 and the second edge 32B includes the second indicia 54 so that the same slot 30 functions to show two distinct cutting locations. The width W of the slot 30 is therefore critical to the success of the template 10, as it enables the slot 30 to show the two cutting locations in their proper locations relative to the rest of the template 10.

It should be understood that the template 10 includes both the first indicia 44, shown in FIG. 4, and the second indicia 54 shown in FIG. 5, and these indicia 44 and 54 are only shown separately for purposes of clarity. The template 10 may also include additional indicia so that the template 10 enables the user to prepare the door 12 for a wide variety of exit hardware.

Figure 7:
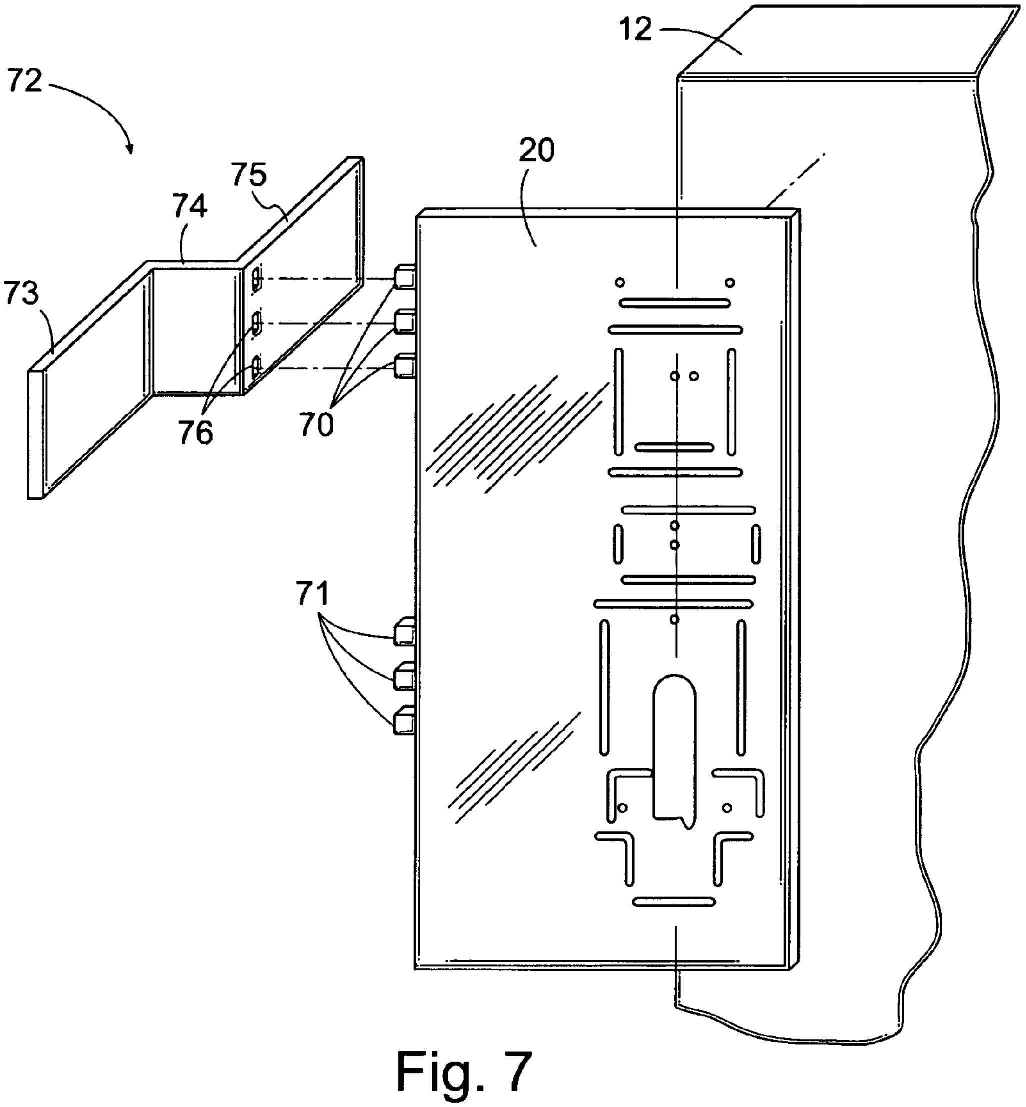
FIG. 7 is a perspective exploded view of an alternative embodiment of the template, further including a backset adjustment bar.

FIG. 7 illustrates an alternative embodiment of the template 10, wherein the template 10 only includes the first sidewall 20. In this embodiment, the means for adjusting includes a backset adjustment bar 72. In this embodiment, the first sidewall 20 further includes tabs 70 extending from the first sidewall 20. The tabs 70, preferably three tabs, are adapted to engage a backset adjustment bar 72. Alternative tabs 71 can also be included to assist in the proper vertical positioning of the template 10. The term "tab", as used in this application, should be broadly construed to include alternative or equivalent elements that enable the first sidewall 20 to engage the backset adjustment bar 72.

The backset adjustment bar 72 includes a first element 73, a second element 74, and a third element 75, the second element 74 connecting the first and third elements 73 and 75. Slots 76 are positioned in the second element 74 and are adapted to receive the tabs 70.

Figure 8:
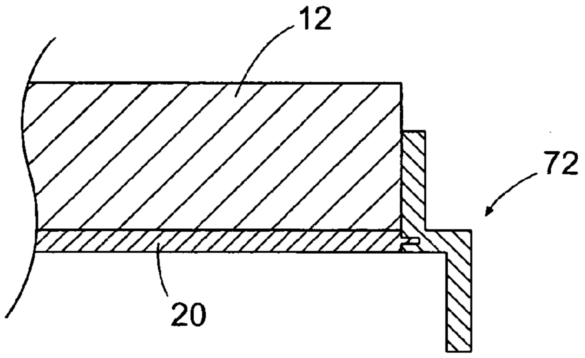
FIG. 8 is a sectional view thereof, illustrating how the template and the backset adjustment bar are interconnected and placed against the door.

In use, as shown in FIGS. 7–8, the backset adjustment bar 72 is a engaged to the first sidewall 20 by inserting the tabs 70 into the slots 76. When the first sidewall 20 is positioned against the door 12, the third element 76 abuts the door 12 and laterally positions the template 10. If the backset adjustment bar 72 is turned around, the first element 73 abuts the door 12 rather than the third element 75, thereby adjusting the backset of the template 10.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A template for cutting a door, the template comprising:

a first sidewall;

a plurality of through holes through said first sidewall indicating centers of proposed mounting holes;

a plurality of through slots through said first sidewall, each of said plurality of through slots having first and second edges separated by a width, both said first and second edges indicating proposed cutting lines with said width operably spacing said first and second edges;

a first indicia printed on said first sidewall for indicating said through holes and said edges that together operate to indicate said holes and cuts necessary for a first cutting operation;

a second indicia printed on said first sidewall for indicating said through holes and said edges that together operate to indicate said holes and cuts necessary for a second cutting operation; and a means for adjusting the relative position of said first sidewall with respect to said edge of said door.

2. The template of claim 1 further comprising a second sidewall and a third sidewall, and wherein said means for adjusting said position of said first sidewall is a pair of backset screws that extend through the third sidewall.

3. The template of claim 2 wherein each of said pair of backset screws include a head, a threaded body, and a pair of locking nuts.

4. The template of claim 1 wherein said first indicia includes an edge highlighting line that abuts said edge of one of said plurality of through slots.

5. The template of claim 4 wherein said edge highlighting line is colored a first distinct color.

6. The template of claim 5 wherein said first indicia preferably also includes a descriptive term associated with said edge highlighting line.

7. The template of claim 1 wherein said means for adjusting includes a backset adjustment bar.

8. A template for cutting a door, the door having an edge, a front face, and a rear face, the template comprising:

a first sidewall and a second sidewall laterally spaced by a third sidewall such that when said template is placed over said edge of said door, said first sidewall abuts said front face of said door, said second sidewall abuts said rear face of said door, and said third sidewall abuts said edge of said door, thereby positioning said template for use;

a plurality of through holes through said first sidewall indicating centers of proposed mounting holes, a plurality of through slots through said first sidewall, each of said plurality of through slots having edges separated by a width, at least one of said edges indicating edges of proposed cutting lines;

a first indicia printed on said first sidewall for indicating said through holes and said edges that together operate to indicate said holes and cuts necessary for a first cutting operation; and a second indicia printed on said first sidewall for indicating said through holes and said edges that together operate to indicate said holes and cuts necessary for a second cutting operation.

9. The template of claim 8 wherein said third sidewall includes a means for adjusting said position of said third sidewall with respect to said edge of said door.

10. The template of claim 9 wherein said means for adjusting said position of said third sidewall is a pair of basket screws that extend through said third sidewall.

11. The template of claim 10 wherein each of said pair of backset screws include a head, a threaded body, and a pair of locking nuts.

12. The template of claim 8 wherein said first indicia includes an edge highlighting line that abuts said edge of one or said plurality of through slots.

13. The template of claim 12 wherein said edge highlighting line is colored a first distinct color.

14. The template of claim 13 wherein said first indicia preferably also includes a descriptive term associated with said edge highlighting line.

15. The template of claim 8 wherein said means for adjusting includes a backset adjustment bar.

16. A template for cutting a door, the template comprising:

a first sidewall;

a plurality of through holes through said first sidewall indicating centers of proposed mounting holes;

a plurality of through slots through said first sidewall, each of said plurality of through slots having first and second edges separated by a width, both said first and second edges indicating proposed cutting lines with said width operably spacing said first and second edges;

a first indicia printed on said first sidewall, including the first edge of at least some of the plurality of slots, for indicating said through holes and said edges that together operate to indicate said holes and cuts necessary for a first cutting operation; and a second indicia printed on said first sidewall, including the second edge of at least some of the plurality of slots, for indicating said through holes and said edges that together operate to indicate said holes and cuts necessary for a second cutting operation.

* * * * *